(12) United States Patent
Chiu (10) Patent No.: US 10,156,698 B2
(45) Date of Patent: Dec. 18, 2018

(54) WIDE-ANGLE LENS ASSEMBLY

(71) Applicants: Sintai Optical (Shenzhen) Co., Ltd., ShenZhen, Guandong Province (CN); Asia Optical Co., Inc., Taichung (TW)

(72) Inventor: Wei-Ting Chiu, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 57 days.

(21) Appl. No.: 15/435,340

(22) Filed: Feb. 17, 2017

(65) Prior Publication Data

US 2017/0315330 A1    Nov. 2, 2017

(30) Foreign Application Priority Data

Apr. 29, 2016   (CN) .......................... 2016 1 0284810

(51) Int. Cl.
   *G02B 13/00*    (2006.01)
   *G02B 9/34*     (2006.01)
   *G02B 9/62*     (2006.01)

(52) U.S. Cl.
   CPC ............. *G02B 13/004* (2013.01); *G02B 9/34* (2013.01); *G02B 9/62* (2013.01); *G02B 13/006* (2013.01); *G02B 13/0045* (2013.01)

(58) Field of Classification Search
   CPC ................. G02B 13/002; G02B 13/004; G02B 13/0045; G02B 13/005; G02B 9/34; G02B 9/62; G02B 9/64; G02B 13/006
   USPC ....... 359/713, 714, 715, 755, 756, 761, 762, 359/770, 771, 776, 778, 781
   See application file for complete search history.

(56) References Cited

U.S. PATENT DOCUMENTS

| | | | | |
|---|---|---|---|---|
| 2012/0056976 A1* | 3/2012 | Lee | ......................... | G02B 13/04 348/36 |
| 2014/0268367 A1* | 9/2014 | Kawamura | ............ | G02B 13/04 359/708 |
| 2016/0370558 A1* | 12/2016 | Takato | .................... | G02B 13/04 |
| 2017/0347867 A1* | 12/2017 | Sato | ......................... | A61B 1/04 |

* cited by examiner

*Primary Examiner* — Marin Pichler
(74) *Attorney, Agent, or Firm* — McClure, Qualey & Rodack, LLP (57) ABSTRACT

A wide-angle lens assembly comprises sequentially from an object side to an image side along an optical axis a first lens, a second lens, a third lens, a fourth lens, a fifth lens and a sixth lens. The first lens is with negative refractive power and includes a concave surface facing the image side. The second lens includes a concave surface facing the object side. The third lens includes a convex surface facing the image side. The fourth lens includes a convex surface facing the object side. The fifth lens includes a concave surface facing the image side. The sixth lens is a biconvex lens with positive refractive power. The second lens and the third lens are cemented to form a first cemented lens with positive refractive power. The fourth lens and the fifth lens are cemented to form a second cemented lens with positive refractive power.

16 Claims, 12 Drawing Sheets

WIDE-ANGLE LENS ASSEMBLY

BACKGROUND OF THE INVENTION

Field of the Invention

The invention relates to a wide-angle lens assembly.

Description of the Related Art

Nowadays, the development trend of wide-angle lens, in addition to continuously toward miniaturization and wide field of view, also need to have large aperture and resist the change of environment temperature for different application requirements. However, the known wide-angle lens can't satisfy such requirements. Therefore, a wide-angle lens needs a new structure in order to meet the requirements of miniaturization, wide field of view, large aperture and resistance to environment temperature change at the same time.

BRIEF SUMMARY OF THE INVENTION

The invention provides a wide-angle lens assembly to solve the above problems. The wide-angle lens assembly of the invention is provided with characteristics of a shortened total lens length, a wider field of view, a decreased F-number and a resistance to environment temperature change and still has a good optical performance.

The wide-angle lens assembly in accordance with the invention comprises a first lens, a second lens, a third lens, a fourth lens, a fifth lens and a sixth lens, all of which are arranged in order from an object side to an image side along an optical axis. The first lens is with negative refractive power and includes a concave surface facing the image side. The second lens is with refractive power and includes a concave surface facing the object side. The third lens is with refractive power and includes a convex surface facing the image side. The fourth lens is with refractive power and includes a convex surface facing the object side. The fifth lens is with refractive power and includes a concave surface facing the image side. The sixth lens is a biconvex lens with positive refractive power. The second lens and the third lens are cemented together to form a first cemented lens with positive refractive power. The fourth lens and the fifth lens are cemented together to form a second cemented lens with positive refractive power.

The second lens is with negative refractive power.

The second lens further includes a convex surface facing the image side.

The second lens further includes a concave surface facing the image side.

The third lens is with positive refractive power.

The fifth lens is with negative refractive power.

The fourth lens is with positive refractive power and further includes a convex surface facing the image side.

The wide-angle lens assembly satisfies $0.2 \leq TL/\theta_m \leq 0.4$, wherein TL is an interval in mm from an object surface of the first lens to an image plane along the optical axis and $\theta_m$ is a half maximum field of view in degree for the wide-angle lens assembly.

The sixth lens is an aspheric lens and further includes a stop disposed between the third lens and the fourth lens.

The first lens satisfies $-3 \leq f_1/R_{12} \leq -1.67$, wherein $f_1$ is an effective focal length of the first lens and $R_{12}$ is a radius of curvature of the concave surface of the first lens.

The wide-angle lens assembly satisfies $0.7 \leq ER_{11}/f \leq 1.6$, wherein $ER_{11}$ is an effective radius of an object side surface of the first lens and f is an effective focal length of the wide-angle lens assembly.

The wide-angle lens assembly satisfies $30 \leq Vd_2-Vd_3 \leq 50$, wherein $Vd_2$ is an Abbe number of the second lens and $Vd_3$ is an Abbe number of the third lens.

The wide-angle lens assembly satisfies $30 \leq Vd_4-Vd_5 \leq 50$, wherein $Vd_4$ is an Abbe number of the fourth lens and $Vd_5$ is an Abbe number of the fifth lens.

The wide-angle lens assembly in accordance with the invention comprises a first lens, a second lens, a third lens, a fourth lens, a fifth lens and a sixth lens, all of which are arranged in order from an object side to an image side along an optical axis. The first lens is with negative refractive power and includes a concave surface facing the image side. The second lens is with negative refractive power and includes a concave surface facing the object side and a convex surface facing the image side. The third lens is with positive refractive power and includes a concave surface facing the object side and a convex surface facing the image side. The fourth lens is with positive refractive power and includes a convex surface facing the object side. The fifth lens is with refractive power and includes a concave surface facing the image side. The sixth lens is a biconvex lens with positive refractive power. The second lens and the third lens are cemented together to form a first cemented lens with positive refractive power. The fourth lens and the fifth lens are cemented together to form a second cemented lens with positive refractive power.

The first lens includes a convex surface facing the object side.

The first lens includes a concave surface facing the object side.

The wide-angle lens assembly in accordance with the invention comprises a first lens, a second lens, a third lens, a fourth lens, a fifth lens and a sixth lens, all of which are arranged in order from an object side to an image side along an optical axis. The first lens is with negative refractive power and includes a convex surface facing the object side and a concave surface facing the image side. The second lens is with negative refractive power and includes a concave surface facing the object side. The third lens is with positive refractive power and includes a convex surface facing the image side. The fourth lens is with positive refractive power and includes a convex surface facing the object side. The fifth lens is with refractive power and includes a concave surface facing the image side. The sixth lens is a biconvex lens with positive refractive power. The second lens and the third lens are cemented together to form a first cemented lens with positive refractive power. The fourth lens and the fifth lens are cemented together to form a second cemented lens with positive refractive power.

The second lens includes a convex surface facing the image side and the third lens includes a convex surface facing the object side.

The second lens includes a concave surface facing the image side and the third lens includes a concave surface facing the object side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
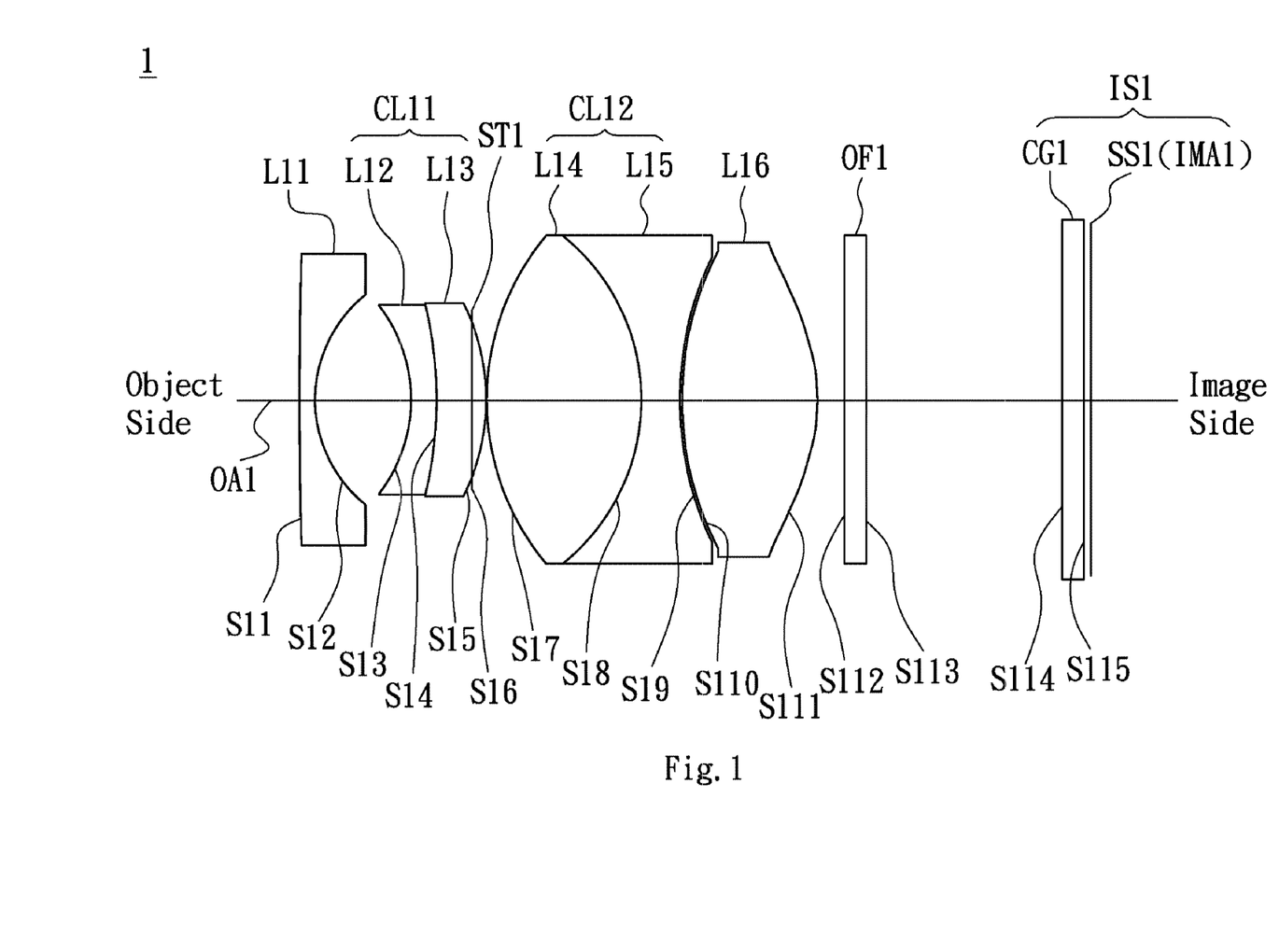
FIG. 1 is a lens layout diagram of a wide-angle lens assembly in accordance with a first embodiment of the invention.

Referring to FIG. 1, FIG. 1 is a lens layout diagram of a wide-angle lens assembly in accordance with a first embodiment of the invention. The wide-angle lens assembly 1 includes a first lens L11, a second lens L12, a third lens L13, a stop ST1, a fourth lens L14, a fifth lens L15, a sixth lens L16 and an optical filter OF1, all of which are arranged in order from an object side to an image side along an optical axis OA1. An image sensor IS1 is disposed between the optical filter OF1 and the image side. A sensor surface SS1 of the image sensor IS1 is disposed at an image plane IMA1. In operation, an image of light rays from the object side is formed at the image plane IMA1. The first lens L11 is a meniscus lens with negative refractive power, wherein the object side surface S11 is a convex surface, the image side surface S12 is a concave surface and both of the object side surface S11 and image side surface S12 are spherical surfaces. The second lens L12 is a meniscus lens, wherein the object side surface S13 is a concave surface, the image side surface S14 is a convex surface and both of the object side surface S13 and image side surface S14 are spherical surfaces. The third lens L13 is a meniscus lens, wherein the object side surface S14 is a concave surface, the image side surface S15 is a convex surface and both of the object side surface S14 and image side surface S15 are spherical surfaces. The second lens L12 and the third lens L13 are cemented together to form a first cemented lens CL11. The first cemented lens CL11 is a meniscus lens with positive refractive power. The fourth lens L14 is a biconvex lens, wherein the object side surface S17 is a convex surface, the image side surface S18 is a convex surface and both of the object side surface S17 and image side surface S18 are spherical surfaces. The fifth lens L15 is a biconcave lens, wherein the object side surface S18 is a concave surface, the image side surface S19 is a concave surface and both of the object side surface S18 and image side surface S19 are spherical surfaces. The fourth lens L14 and the fifth lens L15 are cemented together to form a second cemented lens CL12. The second cemented lens CL12 is a meniscus lens with positive refractive power. The sixth lens L16 is an aspheric biconvex lens with positive refractive power, wherein the object side surface S110 is a convex surface, the image side surface S111 is a convex surface and both of the object side surface S110 and image side surface S111 are aspheric surfaces. Both of the object side surface S112 and image side surface S113 of the optical filter OF1 are plane surfaces. The image sensor IS1 includes a cover glass CG1 and a sensor element (not shown). The cover glass CG1 includes a surface S114 and a surface S115 both of which are plane surfaces, is used to protect the sensor surface SS1 of the sensor element from scratching or prevent dust adhesion.

In order to maintain excellent optical performance of the wide-angle lens assembly in accordance with the first embodiment of the invention, the wide-angle lens assembly 1 satisfies at least one of the following conditions:

$$0.2 \leq TL1/\theta 1_m \leq 0.4 \quad (1)$$

$$-3 \leq f1_1/R1_{12} \leq -1.67 \quad (2)$$

$$0.7 \leq ER1_{11}/f1 \leq 1.6 \quad (3)$$

$$30 \leq Vd1_2 - Vd1_3 \leq 50 \quad (4)$$

$$30 \leq Vd1_4 - Vd1_5 \leq 50 \quad (5)$$

wherein TL1 is an interval in mm from the object surface S11 of the first lens L11 to the image plane IMA1 along the optical axis OA1, $\theta 1_m$ is a half maximum field of view in degree for the wide-angle lens assembly 1, $f1_1$ is an effective focal length of the first lens L11, $R1_{12}$ is a radius of curvature of the image side surface S12 of the first lens L11, $ER1_{11}$ is an effective radius of the object side surface S11 of the first lens L11, f1 is an effective focal length of the wide-angle lens assembly 1, $Vd1_2$ is an Abbe number of the second lens L12, $Vd1_3$ is an Abbe number of the third lens L13, $Vd1_4$ is an Abbe number of the fourth lens L14 and $Vd1_5$ is an Abbe number of the fifth lens L15.

By the above design of the lenses and stop ST1, the wide-angle lens assembly 1 is provided with a shortened total lens length, a wilder field of view, a decreased F-number, an effective corrected aberration and a decreased effect of temperature change on image quality.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens and Abbe number of each lens. Table 1 shows that the effective focal length is equal to 3.502 mm, F-number is equal to 1.796 and total lens length is equal to 14.504 mm for the wide-angle lens assembly 1 of the first embodiment of the invention.

TABLE 1

Effective Focal Length = 3.502 mm F-number = 1.796
Total Lens Length = 14.504 mm

| Surface Number | Radius of Curvature (mm) | Thickness (mm) | Nd | Vd | Remark |
|---|---|---|---|---|---|
| S11 | 105.404 | 0.294 | 1.49 | 70.4 | The First Lens L11 |
| S12 | 2.503 | 1.751 | | | |
| S13 | −2.811 | 0.472 | 1.52 | 64.2 | The Second Lens L12 |
| S14 | −7.580 | 0.917 | 1.9 | 31.3 | The Third Lens L13 |
| S15 | −3.914 | −0.267 | | | |
| S16 | ∞ | 0.276 | | | Stop ST1 |
| S17 | 4.659 | 2.833 | 1.64 | 60.2 | The Fourth Lens L14 |
| S18 | −3.845 | 0.712 | 1.74 | 27.8 | The Fifth Lens L15 |
| S19 | 6.088 | 0.032 | | | |
| S110 | 4.967 | 2.492 | 1.6 | 67.7 | The Sixth Lens L16 |
| S111 | −3.868 | 0.500 | | | |
| S112 | ∞ | 0.400 | 1.52 | 54.5 | Optical Filter OF1 |
| S113 | ∞ | 3.601 | | | |
| S114 | ∞ | 0.400 | 1.52 | 54.5 | Cover Glass CG1 |
| S115 | ∞ | 0.125 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^5 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| Surface Number | k | A | B | C | D | E |
|---|---|---|---|---|---|---|
| S110 | −14.849 | 9.55E−03 | −1.74E−03 | 1.96E−04 | −8.59E−06 | 0 |
| S111 | −2.483 | −2.29E−03 | 3.48E−04 | −3.47E−05 | 3.93E−06 | 0 |

For the wide-angle lens assembly 1 of the first embodiment, the interval TL1 from the object side surface S11 of the first lens L11 to the image plane IMA1 along the optical axis OA1 is equal to 14.504 mm, the half maximum field of view $\theta 1_m$ for the wide-angle lens assembly 1 is equal to 51.4 degrees, the effective focal length $f1_1$ of the first lens L11 is equal to −5.247 mm, the radius of curvature $R1_{12}$ of the image side surface S12 of the first lens L11 is equal to 2.503 mm, the effective radius $ER1_{11}$ of the object side surface S11 of the first lens L11 is equal to 2.667 mm, the effective focal length f1 of the wide-angle lens assembly 1 is equal to 3.502 mm, the Abbe number $Vd1_2$ of the second lens L12 is equal to 64.2, the Abbe number $Vd1_3$ of the third lens L13 is equal to 31.3, the Abbe number $Vd1_4$ of the fourth lens L14 is equal to 60.2 and the Abbe number $Vd1_5$ of the fifth lens L15 is equal to 27.8. According to the above data, the following values can be obtained:

$TL1/\theta1_m = 0.28,$ $f1_1/R1_{12} = -2.10,$ $ER1_{11}/f1 = 0.76,$ $Vd1_2 - Vd1_3 = 32.9,$ $Vd1_4 - Vd1_5 = 32.4$ which respectively satisfy the above conditions (1)-(5).

Figure 2A:
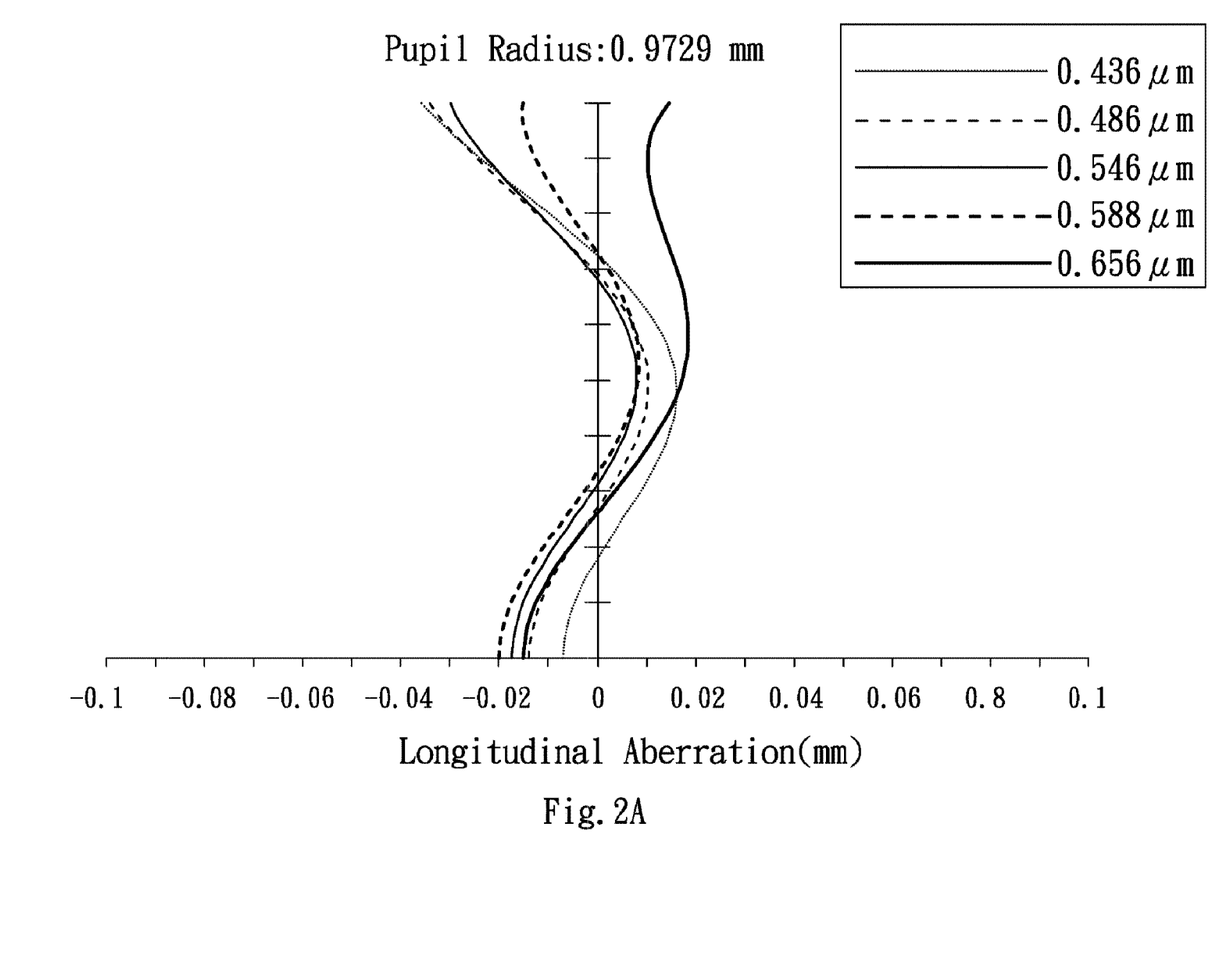
FIG. 2A depicts a longitudinal aberration diagram of the wide-angle lens assembly in accordance with the first embodiment of the invention.
Figure 2B:
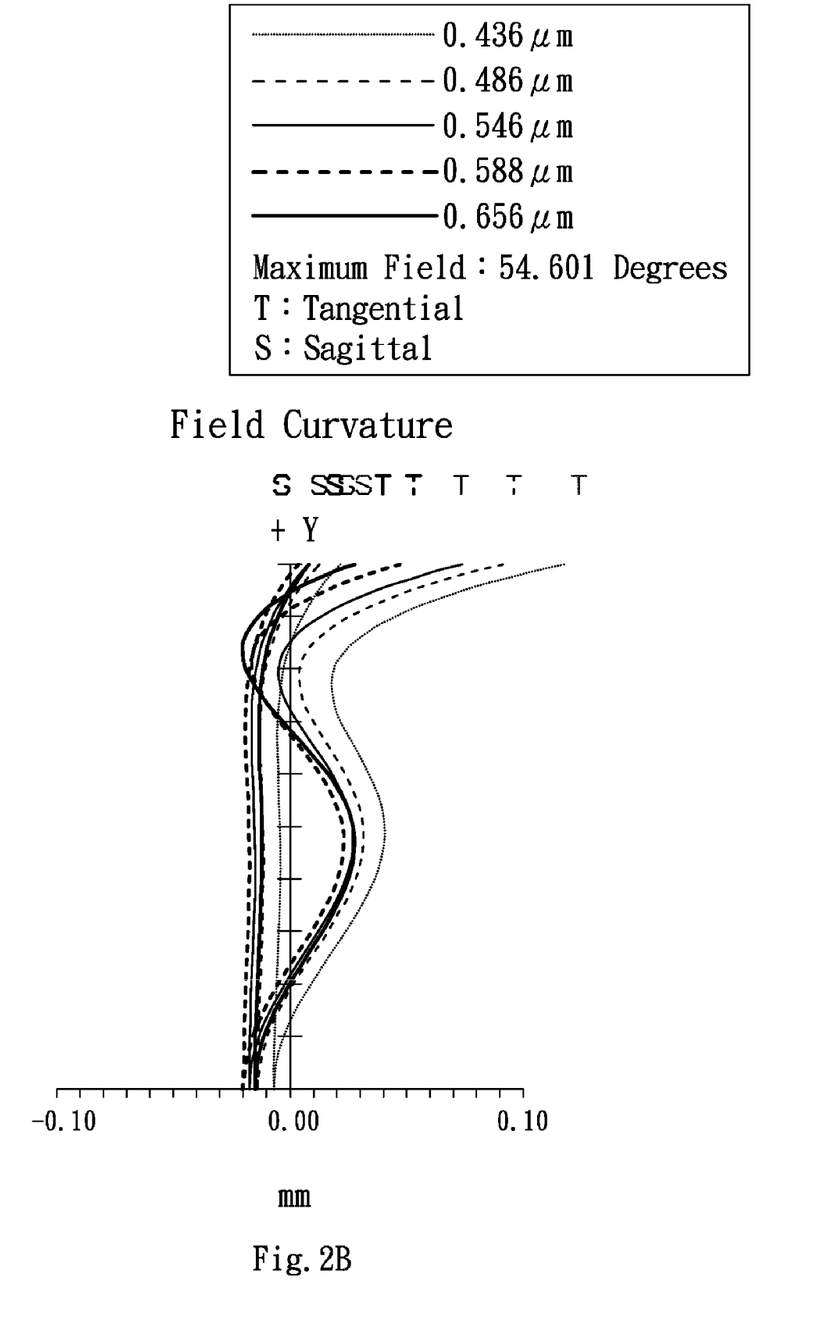
FIG. 2B is a field curvature diagram of the wide-angle lens assembly in accordance with the first embodiment of the invention.
Figure 2C:
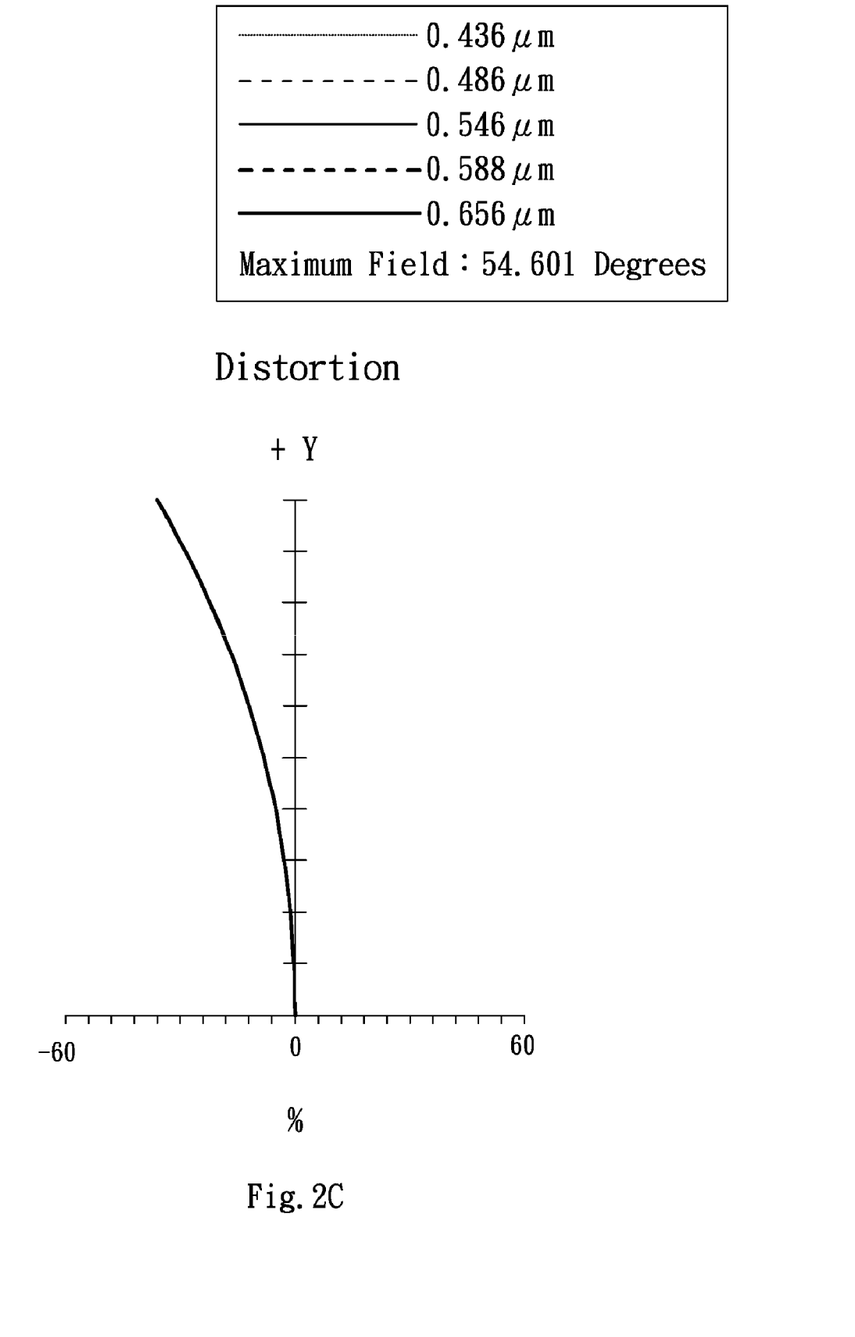
FIG. 2C is a distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C, wherein FIG. 2A shows a longitudinal aberration diagram of the wide-angle lens assembly 1 in accordance with the first embodiment of the invention, FIG. 2B shows a field curvature diagram of the wide-angle lens assembly 1 in accordance with the first embodiment of the invention and FIG. 2C shows a distortion diagram of the wide-angle lens assembly 1 in accordance with the first embodiment of the invention.

It can be seen from FIG. 2A that the longitudinal aberration in the wide-angle lens assembly 1 of the first embodiment ranges from −0.04 mm to 0.02 mm for the wavelength of 0.436 μm, 0.486 μm, 0.546 μm, 0.588 μm and 0.656 μm. It can be seen from FIG. 2B that the field curvature of tangential direction and sagittal direction in the wide-angle lens assembly 1 of the first embodiment ranges from −0.02 mm to 0.12 mm for the wavelength of 0.436 μm, 0.486 μm, 0.546 μm, 0.588 μm and 0.656 μm. It can be seen from FIG. 2C (in which the five lines in the figure almost coincide to appear as if a signal line) that the distortion in the wide-angle lens assembly 1 of the first embodiment ranges from −36% to 0% for the wavelength of 0.436 μm, 0.486 μm, 0.546 μm, 0.588 μm and 0.656 μm. It is obvious that the longitudinal aberration, the field curvature and the distortion of the wide-angle lens assembly 1 of the first embodiment can be corrected effectively. Therefore, the wide-angle lens assembly 1 of the first embodiment is capable of good optical performance.

Figure 3:
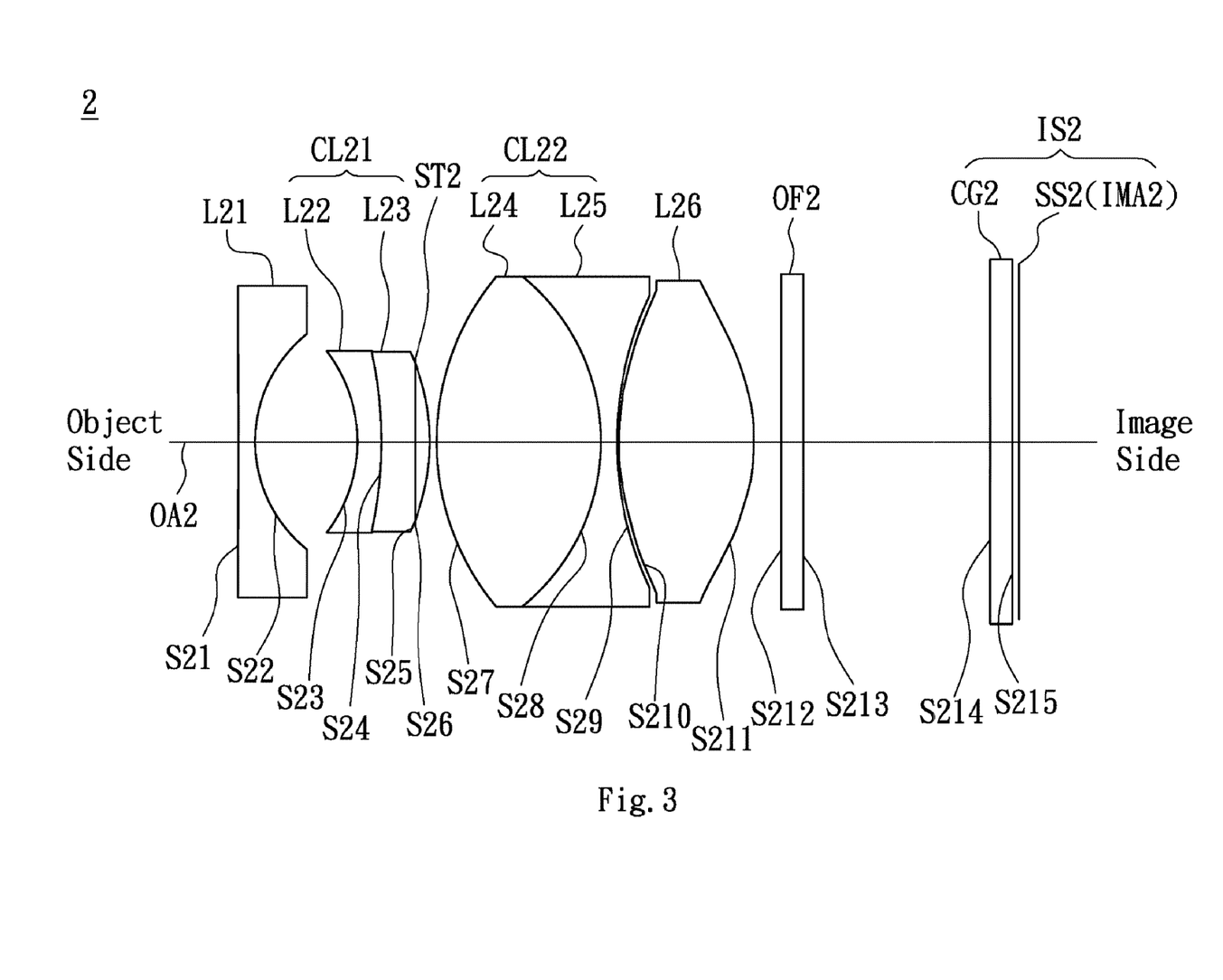
FIG. 3 is a lens layout diagram of a wide-angle lens assembly in accordance with a second embodiment of the invention.

Referring to FIG. 3, FIG. 3 is a lens layout diagram of a wide-angle lens assembly in accordance with a second embodiment of the invention. The wide-angle lens assembly 2 includes a first lens L21, a second lens L22, a third lens L23, a stop ST2, a fourth lens L24, a fifth lens L25, a sixth lens L26 and an optical filter OF2, all of which are arranged in order from an object side to an image side along an optical axis OA2. An image sensor IS2 is disposed between the optical filter OF2 and the image side. A sensor surface SS2 of the image sensor IS2 is disposed at an image plane IMA2. In operation, an image of light rays from the object side is formed at the image plane IMA2. The first lens L21 is a biconcave lens with negative refractive power, wherein the object side surface S21 is a concave surface, the image side surface S22 is a concave surface and both of the object side surface S21 and image side surface S22 are spherical surfaces. The second lens L22 is a meniscus lens, wherein the object side surface S23 is a concave surface, the image side surface S24 is a convex surface and both of the object side surface S23 and image side surface S24 are spherical surfaces. The third lens L23 is a meniscus lens, wherein the object side surface S24 is a concave surface, the image side surface S25 is a convex surface and both of the object side surface S24 and image side surface S25 are spherical surfaces. The second lens L22 and the third lens L23 are cemented together to form a first cemented lens CL21. The first cemented lens CL21 is a meniscus lens with positive refractive power. The fourth lens L24 is a biconvex lens, wherein the object side surface S27 is a convex surface, the image side surface S28 is a convex surface and both of the object side surface S27 and image side surface S28 are spherical surfaces. The fifth lens L25 is a biconcave lens, wherein the object side surface S28 is a concave surface, the image side surface S29 is a concave surface and both of the object side surface S28 and image side surface S29 are spherical surfaces. The fourth lens L24 and the fifth lens L25 are cemented together to form a second cemented lens CL22. The second cemented lens CL22 is a meniscus lens with positive refractive power. The sixth lens L26 is an aspheric biconvex lens with positive refractive power, wherein the object side surface S210 is a convex surface, the image side surface S211 is a convex surface and both of the object side surface S210 and image side surface S211 are aspheric surfaces. Both of the object side surface S212 and image side surface S213 of the optical filter OF2 are plane surfaces. The image sensor IS2 includes a cover glass CG2 and a sensor element (not shown). The cover glass CG2 includes a surface S214 and a surface S215 both of which are plane surfaces, is used to protect the sensor surface SS2 of the sensor element from scratching or prevent dust adhesion.

In order to maintain excellent optical performance of the wide-angle lens assembly in accordance with the second embodiment of the invention, the wide-angle lens assembly 2 satisfies at least one of the following conditions:

$$0.2 \leq TL2/\theta2_m \leq 0.4 \quad (6)$$

$$-3 \leq f2_1/R2_{12} \leq -1.67 \quad (7)$$

$$0.7 \leq ER2_{11}/f2 \leq 1.6 \quad (8)$$

$$30 \leq Vd2_2 - Vd2_3 \leq 50 \quad (9)$$

$$30 \leq Vd2_4 - Vd2_5 \leq 50 \quad (10)$$

wherein TL2 is an interval in mm from the object surface S21 of the first lens L21 to the image plane IMA2 along the optical axis OA2, $\theta2_m$ is a half maximum field of view in degree for the wide-angle lens assembly 2, $f2_1$ is an effective focal length of the first lens L21, $R2_{12}$ is a radius of curvature of the image side surface S22 of the first lens L21, $ER2_{11}$ is an effective radius of the object side surface S21 of the first lens L21, f2 is an effective focal length of the wide-angle lens assembly 2, $Vd2_2$ is an Abbe number of the second lens L22, $Vd2_3$ is an Abbe number of the third lens L23, $Vd2_4$ is an Abbe number of the fourth lens L24 and $Vd2_5$ is an Abbe number of the fifth lens L25.

By the above design of the lenses and stop ST2, the wide-angle lens assembly 2 is provided with a shortened total lens length, a wilder field of view, a decreased F-number, an effective corrected aberration and a decreased effect of temperature change on image quality.

In order to achieve the above purposes and effectively enhance the optical performance, the wide-angle lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens and Abbe number of each lens. Table 3 shows that the effective focal length is equal to 3.203 mm, F-number is equal to 1.8 and total lens length is equal to 14.207 mm for the wide-angle lens assembly 2 of the second embodiment of the invention.

TABLE 3

Effective Focal Length = 3.203 mm F-number = 1.8
Total Lens Length = 14.207 mm

| Surface Number | Radius of Curvature (mm) | Thickness (mm) | Nd | Vd | Remark |
|---|---|---|---|---|---|
| S21 | −150.245 | 0.300 | 1.49 | 70.4 | The First Lens L21 |
| S22 | 2.500 | 1.848 | | | |
| S23 | −2.769 | 0.445 | 1.52 | 64.2 | The Second Lens L22 |
| S24 | −7.660 | 0.889 | 1.9 | 31.3 | The Third Lens L23 |
| S25 | −3.909 | −0.271 | | | |
| S26 | ∞ | 0.388 | | | Stop ST2 |
| S27 | 4.690 | 2.982 | 1.64 | 60.2 | The Fourth Lens L24 |
| S28 | −3.878 | 0.308 | 1.74 | 27.8 | The Fifth Lens L25 |
| S29 | 6.228 | 0.032 | | | |
| S210 | 4.646 | 2.459 | 1.6 | 67.7 | The Sixth Lens L26 |
| S211 | −3.723 | 0.500 | | | |
| S212 | ∞ | 0.400 | 1.52 | 54.5 | Optical Filter OF2 |
| S213 | ∞ | 3.402 | | | |
| S214 | ∞ | 0.400 | 1.52 | 54.5 | Cover Glass CG2 |
| S215 | ∞ | 0.125 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| Surface Number | k | A | B | C | D | E |
|---|---|---|---|---|---|---|
| S210 | −14.266 | 9.45E−03 | −1.78E−03 | 1.93E−04 | −8.39E−06 | 0 |
| S211 | −2.288 | −2.36E−03 | 3.50E−04 | −4.04E−05 | 3.66E−06 | 0 |

For the wide-angle lens assembly 2 of the second embodiment, the interval TL2 from the object side surface S21 of the first lens L21 to the image plane IMA2 along the optical axis OA2 is equal to 14.207 mm, the half maximum field of view $\theta2_m$ for the wide-angle lens assembly 2 is equal to 59.5 degrees, the effective focal length $f2_1$ of the first lens L21 is equal to −5.024 mm, the radius of curvature $R2_{12}$ of the image side surface S22 of the first lens L21 is equal to 2.500 mm, the effective radius $ER2_{11}$ of the object side surface S21 of the first lens L21 is equal to 2.83 mm, the effective focal length f2 of the wide-angle lens assembly 2 is equal to 3.203 mm, the Abbe number $Vd2_2$ of the second lens L22 is equal to 64.2, the Abbe number $Vd2_3$ of the third lens L23 is equal to 31.3, the Abbe number $Vd2_4$ of the fourth lens L24 is equal to 60.2 and the Abbe number $Vd2_5$ of the fifth lens L25 is equal to 27.8. According to the above data, the following values can be obtained:

$$TL2/\theta 2_m = 0.24,$$

$$f2_1/R2_{12} = -2.01,$$

$$ER2_{11}/f2 = 0.88,$$

$$Vd2_2 - Vd2_3 = 32.9,$$

$$Vd2_4 - Vd2_5 = 32.4$$

which respectively satisfy the above conditions (6)-(10).

Figure 4A:
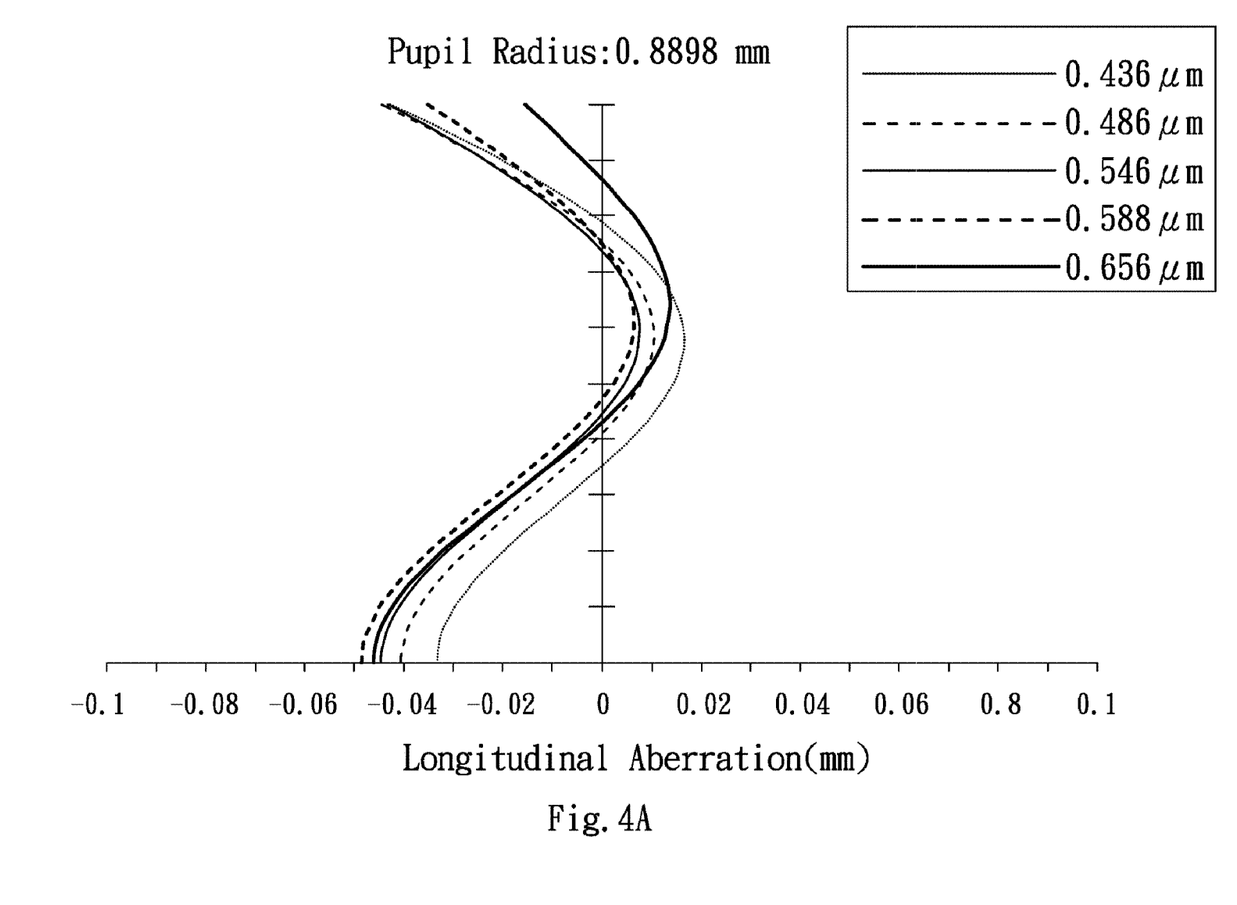
FIG. 4A depicts a longitudinal aberration diagram of the wide-angle lens assembly in accordance with the second embodiment of the invention.
Figure 4B:
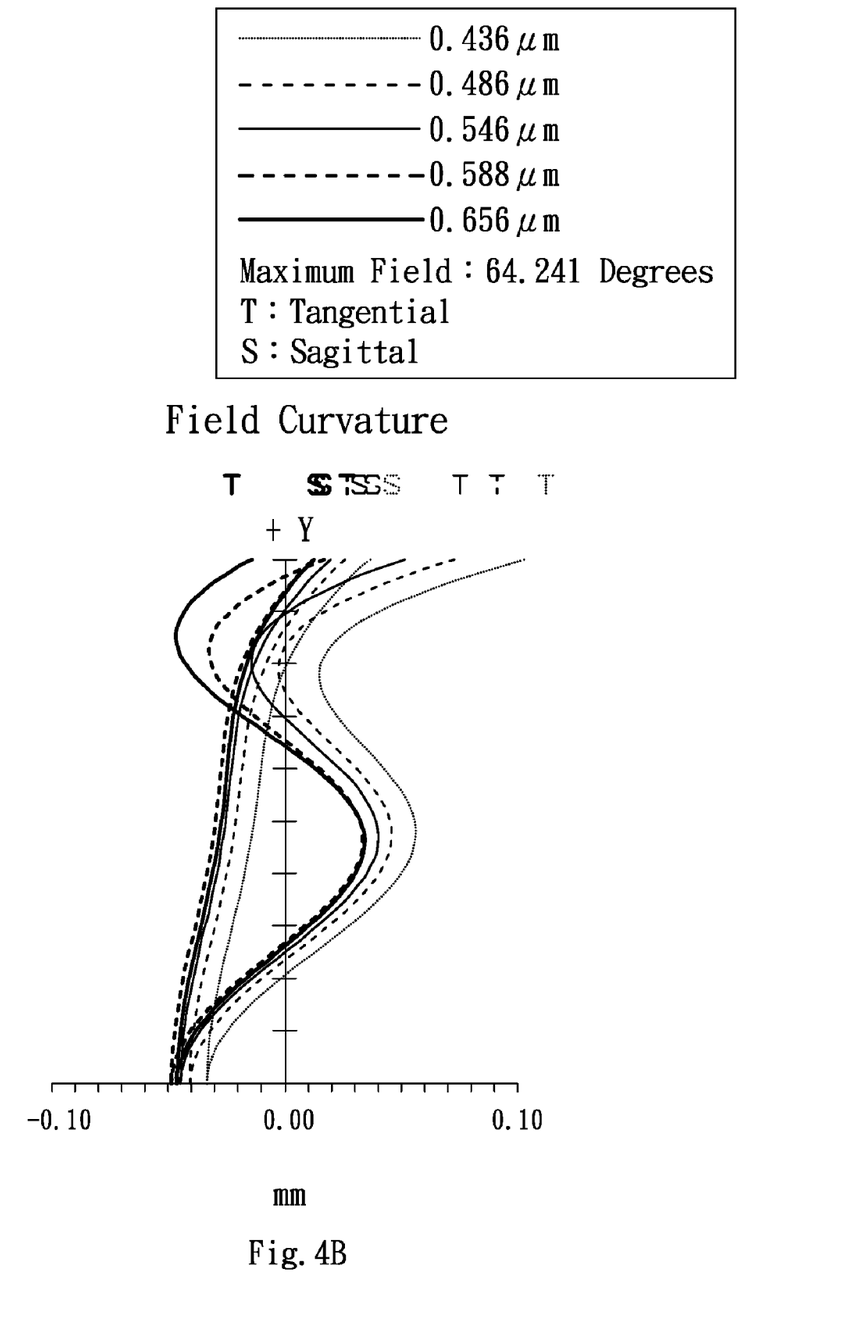
FIG. 4B is a field curvature diagram of the wide-angle lens assembly in accordance with the second embodiment of the invention.
Figure 4C:
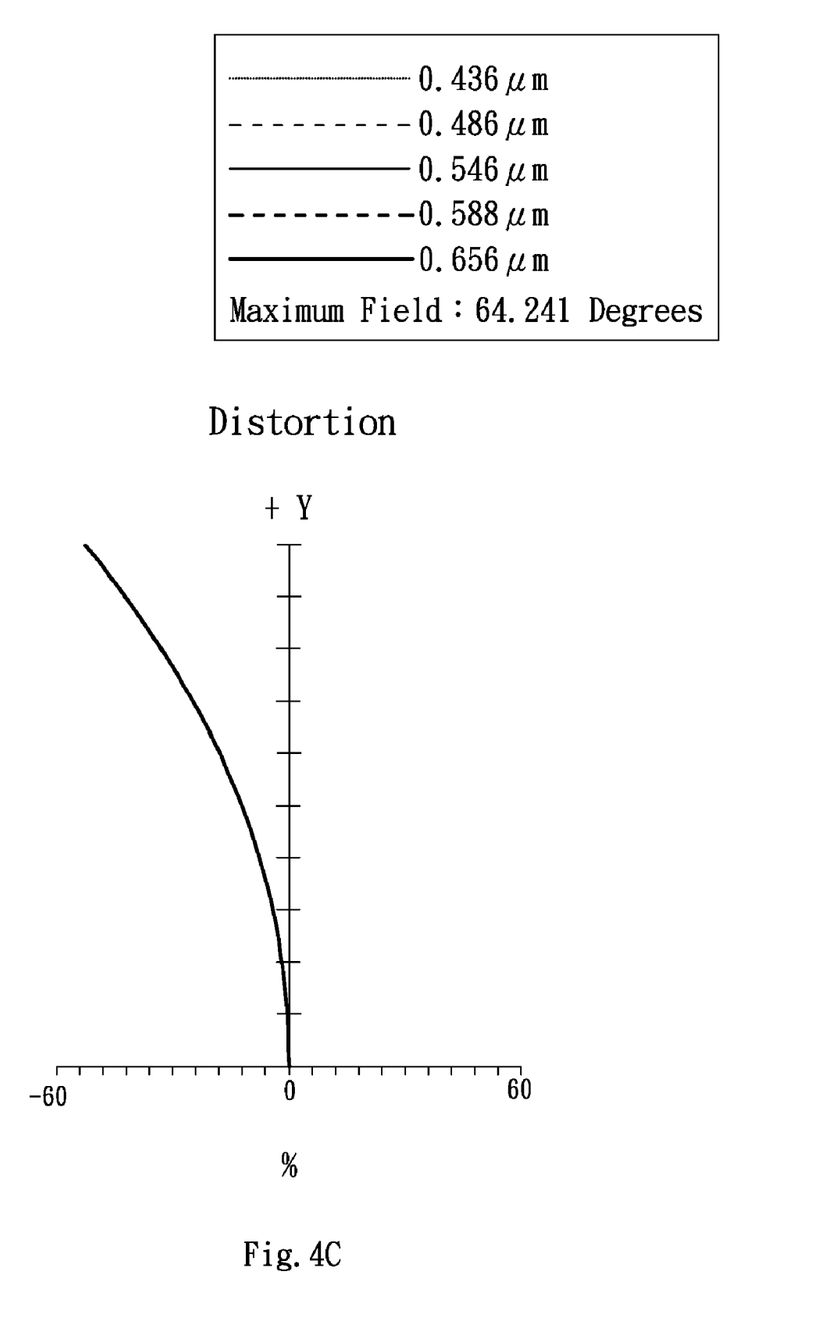
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a longitudinal aberration diagram of the wide-angle lens assembly 2 in accordance with the second embodiment of the invention, FIG. 4B shows a field curvature diagram of the wide-angle lens assembly 2 in accordance with the second embodiment of the invention and FIG. 4C shows a distortion diagram of the wide-angle lens assembly 2 in accordance with the second embodiment of the invention.

It can be seen from FIG. 4A that the longitudinal aberration in the wide-angle lens assembly 2 of the second embodiment ranges from −0.04 mm to 0.02 mm for the wavelength of 0.436 μm, 0.486 μm, 0.546 μm, 0.588 μm and 0.656 μm. It can be seen from FIG. 4B that the field curvature of tangential direction and sagittal direction in the wide-angle lens assembly 2 of the second embodiment ranges from −0.05 mm to 0.11 mm for the wavelength of 0.436 μm, 0.486 μm, 0.546 μm, 0.588 μm and 0.656 μm. It can be seen from FIG. 4C (in which the five lines in the figure almost coincide to appear as if a signal line) that the distortion in the wide-angle lens assembly 2 of the second embodiment ranges from −54% to 0% for the wavelength of 0.436 μm, 0.486 μm, 0.546 μm, 0.588 μm and 0.656 μm. It is obvious that the longitudinal aberration, the field curvature and the distortion of the wide-angle lens assembly 2 of the second embodiment can be corrected effectively. Therefore, the wide-angle lens assembly 2 of the second embodiment is capable of good optical performance.

Figure 5:
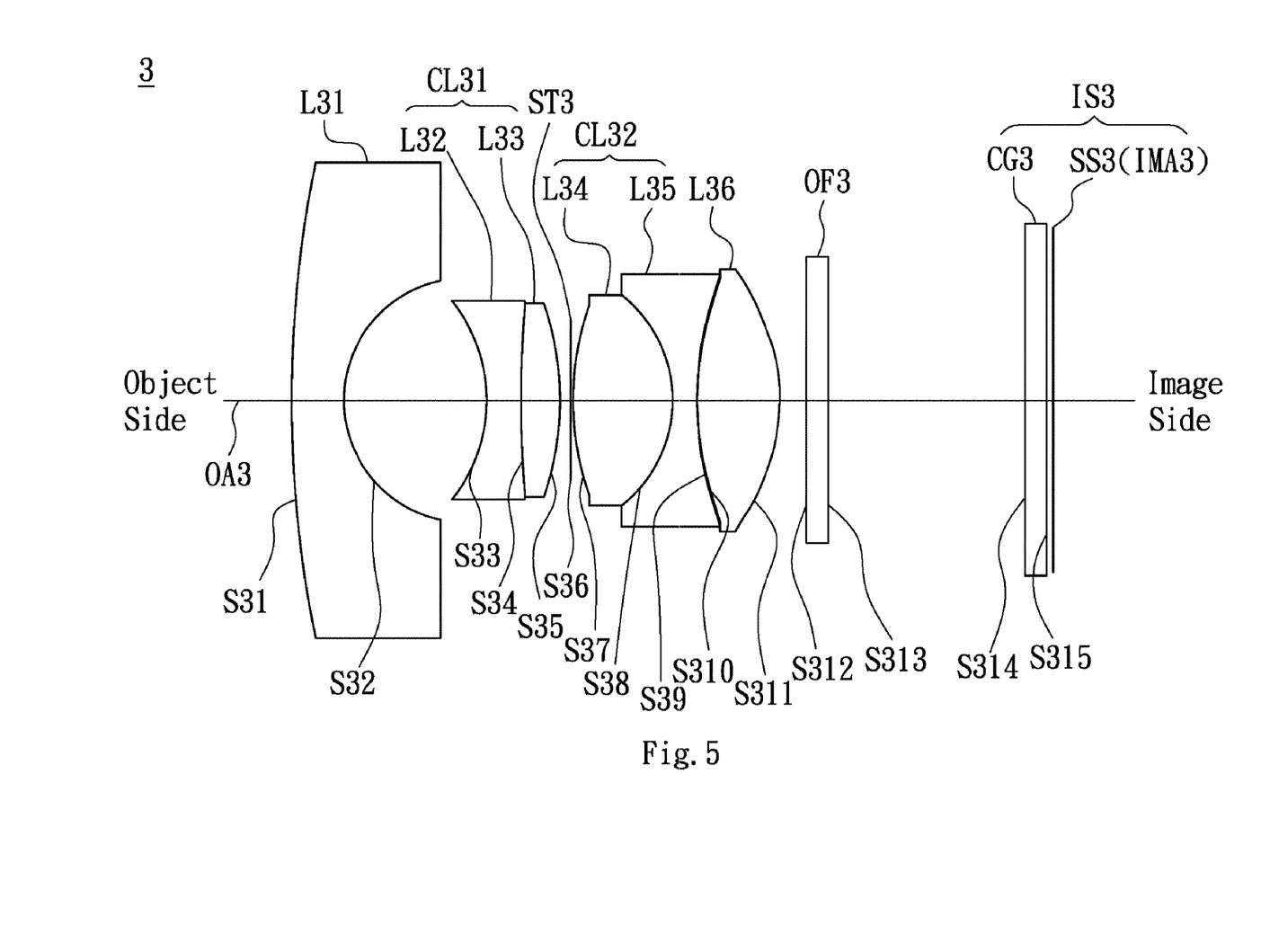
FIG. 5 is a lens layout diagram of a wide-angle lens assembly in accordance with a third embodiment of the invention.

Referring to FIG. 5, FIG. 5 is a lens layout diagram of a wide-angle lens assembly in accordance with a third embodiment of the invention. The wide-angle lens assembly 3 includes a first lens L31, a second lens L32, a third lens L33, a stop ST3, a fourth lens L34, a fifth lens L35, a sixth lens L36 and an optical filter OF3, all of which are arranged in order from an object side to an image side along an optical axis OA3. An image sensor IS3 is disposed between the optical filter OF3 and the image side. A sensor surface SS3 of the image sensor IS3 is disposed at an image plane IMA3. In operation, an image of light rays from the object side is formed at the image plane IMA3. The first lens L31 is a meniscus lens with negative refractive power, wherein the object side surface S31 is a convex surface and the image side surface S32 is a concave surface and both of the object side surface S31 and image side surface S32 are spherical surfaces. The second lens L32 is a biconcave lens, wherein the object side surface S33 is a concave surface, the image side surface S34 is a concave surface and both of the object side surface S33 and image side surface S34 are spherical surfaces. The third lens L33 is a biconvex lens, wherein the object side surface S34 is a convex surface, the image side surface S35 is a convex surface and both of the object side surface S34 and image side surface S35 are spherical surfaces. The second lens L32 and the third lens L33 are cemented together to form a first cemented lens CL31. The first cemented lens CL31 is a meniscus lens with positive refractive power. The fourth lens L34 is a biconvex lens, wherein the object side surface S37 is a convex surface, the image side surface S38 is a convex surface and both of the object side surface S37 and image side surface S38 are spherical surfaces. The fifth lens L35 is a biconcave lens, wherein the object side surface S38 is a concave surface, the image side surface S39 is a concave surface and both of the object side surface S38 and image side surface S39 are spherical surfaces. The fourth lens L34 and the fifth lens L35 are cemented together to form a second cemented lens CL32. The second cemented lens CL32 is a meniscus lens with positive refractive power. The sixth lens L36 is an aspheric biconvex lens with positive refractive power, wherein the object side surface S310 is a convex surface, the image side surface S311 is a convex surface and both of the object side surface S310 and image side surface S311 are aspheric surfaces. Both of the object side surface S312 and image side surface S313 of the optical filter OF3 are plane surfaces. The image sensor IS3 includes a cover glass CG3 and a sensor element (not shown). The cover glass CG3 includes a surface S314 and a surface S315 both of which are plane surfaces, is used to protect the sensor surface SS3 of the sensor element from scratching or prevent dust adhesion.

In order to maintain excellent optical performance of the wide-angle lens assembly in accordance with the third embodiment of the invention, the wide-angle lens assembly 3 satisfies at least one of the following conditions:

$$0.2 \leq TL3/\theta 3_m \leq 0.4 \tag{11}$$

$$-3 \leq f3_1/R3_{12} \leq -1.67 \tag{12}$$

$$0.7 \leq ER3_{11}/f3 \leq 1.6 \tag{13}$$

$$30 \leq Vd3_2 - Vd3_3 \leq 50 \tag{14}$$

$$30 \leq Vd3_4 - Vd3_5 \leq 50 \tag{15}$$

wherein TL3 is an interval in mm from the object surface S31 of the first lens L31 to the image plane IMA3 along the optical axis OA3, $\theta 3_m$ is a half maximum field of view in degree for the wide-angle lens assembly 3, $f3_1$ is an effective focal length of the first lens L31, $R3_{12}$ is a radius of curvature of the image side surface S32 of the first lens L31, $ER3_{11}$ is an effective radius of the object side surface S31 of the first lens L31, f3 is an effective focal length of the wide-angle lens assembly 3, $Vd3_2$ is an Abbe number of the second lens L32, $Vd3_3$ is an Abbe number of the third lens L33, $Vd3_4$ is an Abbe number of the fourth lens L34 and $Vd3_5$ is an Abbe number of the fifth lens L35.

By the above design of the lenses and stop ST3, the wide-angle lens assembly 3 is provided with a shortened total lens length, a wilder field of view, a decreased F-number, an effective corrected aberration and a decreased effect of temperature change on image quality.

In order to achieve the above purposes and effectively enhance the optical performance, the wide-angle lens assembly 3 in accordance with the third embodiment of the invention is provided with the optical specifications shown in Table 5, which include the effective focal length, F-number, total lens length, radius of curvature of each lens surface, thickness between adjacent surface, refractive index of each lens and Abbe number of each lens. Table 5 shows that the effective focal length is equal to 2.833 mm, F-number is equal to 1.856 and total lens length is equal to 14.167 mm for the wide-angle lens assembly 3 of the third embodiment of the invention.

TABLE 5

Effective Focal Length = 2.833 mm F-number = 1.856
Total Lens Length = 14.167 mm

| Surface Number | Radius of Curvature (mm) | Thickness (mm) | Nd | Vd | Remark |
|---|---|---|---|---|---|
| S31 | 21.767 | 0.975 | 1.5 | 81.6 | The First Lens L31 |
| S32 | 2.247 | 2.650 | | | |
| S33 | -2.950 | 0.651 | 1.5 | 62.1 | The Second Lens L32 |
| S34 | 28.246 | 0.715 | 1.9 | 31.3 | The Third Lens L33 |
| S35 | -5.469 | 0.214 | | | |
| S36 | ∞ | 0.041 | | | Stop ST3 |
| S37 | 5.498 | 1.850 | 1.64 | 60.2 | The Fourth Lens L34 |
| S38 | -2.453 | 0.449 | 1.7 | 30.1 | The Fifth Lens L35 |
| S39 | 6.263 | -0.006 | | | |
| S310 | 5.051 | 1.549 | 1.59 | 60.7 | The Sixth Lens L36 |
| S311 | -3.469 | 0.500 | | | |
| S312 | ∞ | 0.400 | 1.52 | 54.5 | Optical Filter OF3 |
| S313 | ∞ | 3.652 | | | |
| S314 | ∞ | 0.400 | 1.52 | 54.5 | Cover Glass CG3 |
| S315 | ∞ | 0.125 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 4.

TABLE 6

| Surface Number | k | A | B | C | D | E |
|---|---|---|---|---|---|---|
| S310 | -8.537 | 1.16E-03 | 2.67E-04 | -1.06E-04 | 9.95E-06 | 0 |
| S311 | -2.332 | -3.89E-03 | 2.69E-04 | -2.03E-05 | 8.35E-07 | 0 |

For the wide-angle lens assembly 3 of the third embodiment, the interval TL3 from the object side surface S31 of the first lens L31 to the image plane IMA3 along the optical axis OA3 is equal to 14.167 mm, the half maximum field of view $\theta3_m$ for the wide-angle lens assembly 3 is equal to 66.5 degrees, the effective focal length $f3_1$ of the first lens L31 is equal to -5.113 mm, the radius of curvature $R3_{12}$ of the image side surface S32 of the first lens L31 is equal to 2.247 mm, the effective radius $ER3_{11}$ of the object side surface S31 of the first lens L31 is equal to 4.4 mm, the effective focal length f3 of the wide-angle lens assembly 3 is equal to 2.833 mm, the Abbe number $Vd3_2$ of the second lens L32 is equal to 62.1, the Abbe number $Vd3_3$ of the third lens L33 is equal to 31.3, the Abbe number $Vd3_4$ of the fourth lens L34 is equal to 60.2 and the Abbe number $Vd3_5$ of the fifth lens L35 is equal to 30.1. According to the above data, the following values can be obtained:

$$TL3/\theta3_m = 0.21,$$

$$f3_1/R3_{12} = -2.28,$$

$$ER3_{11}/f3 = 1.53,$$

$$Vd3_2 - Vd3_3 = 30.8,$$

$$Vd3_4 - Vd3_5 = 30.1$$

which respectively satisfy the above conditions (11)-(15).

Figure 6A:
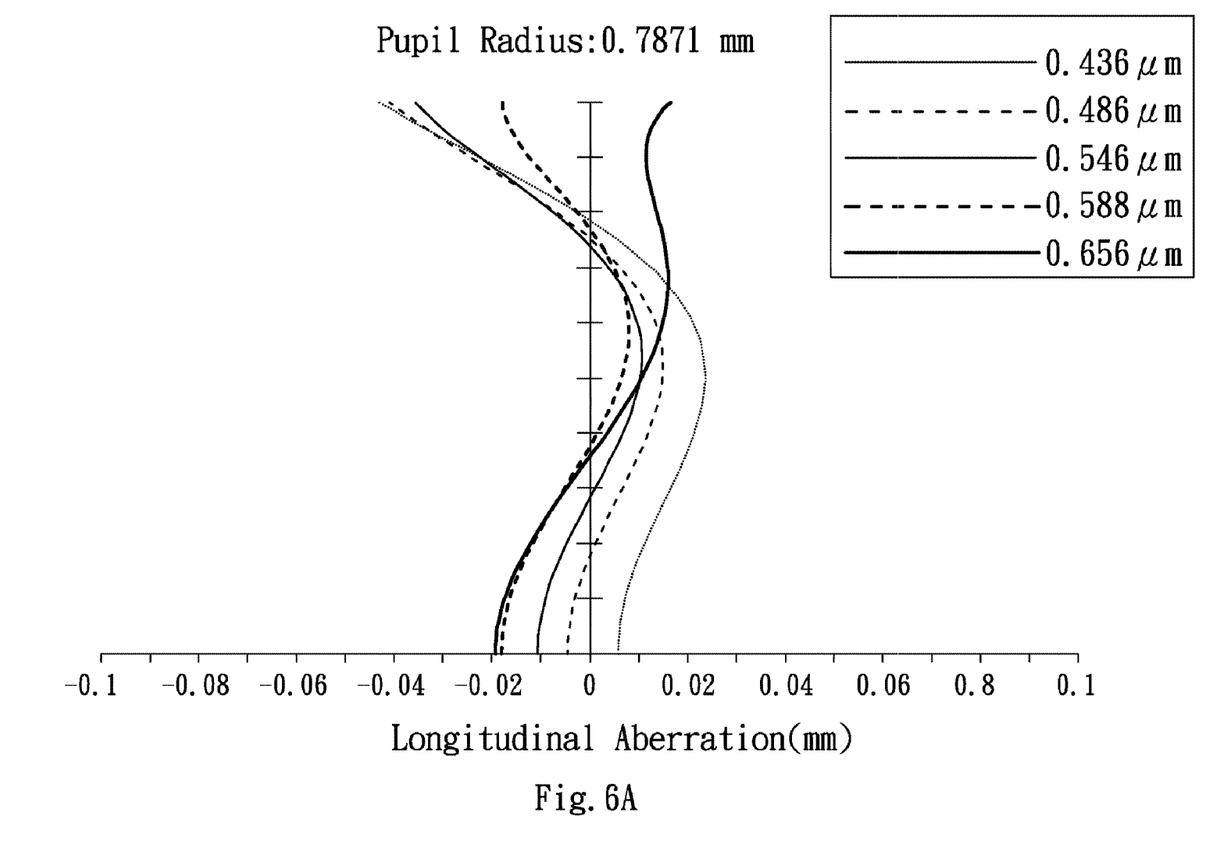
FIG. 6A depicts a longitudinal aberration diagram of the wide-angle lens assembly in accordance with the third embodiment of the invention.
Figure 6B:
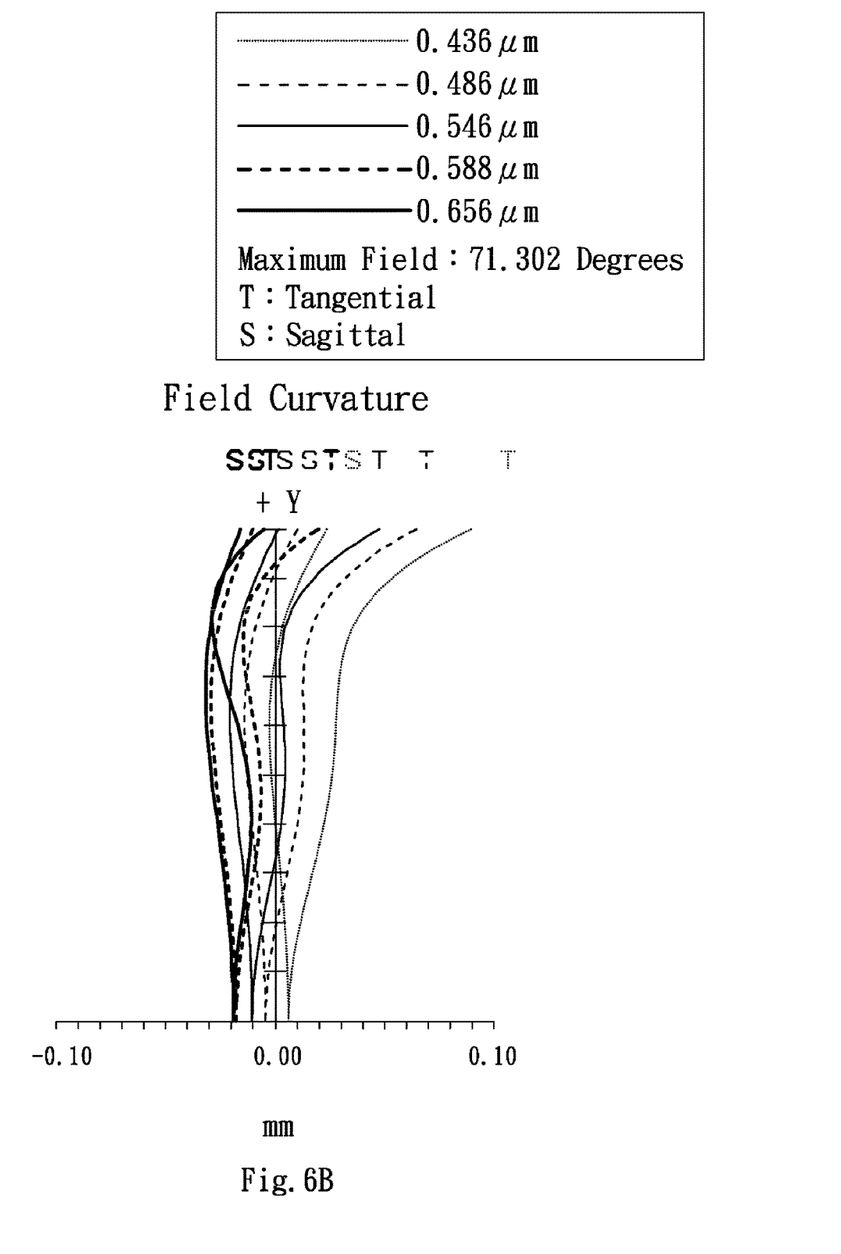
FIG. 6B is a field curvature diagram of the wide-angle lens assembly in accordance with the third embodiment of the invention.
Figure 6C:
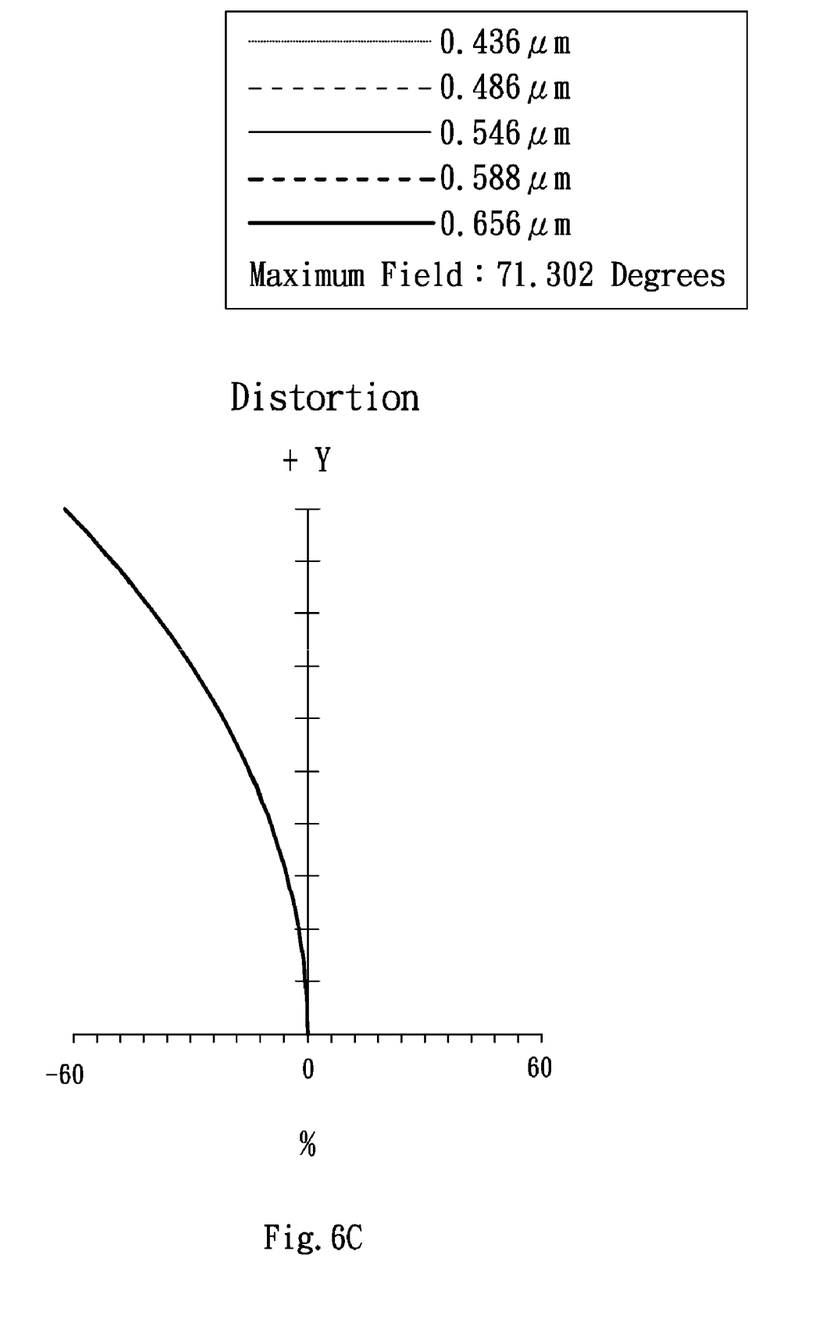
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a longitudinal aberration diagram of the wide-angle lens assembly 3 in accordance with the third embodiment of the invention, FIG. 6B shows a field curvature diagram of the wide-angle lens assembly 3 in accordance with the third embodiment of the invention and FIG. 6C shows a distortion diagram of the wide-angle lens assembly 3 in accordance with the third embodiment of the invention.

It can be seen from FIG. 6A that the longitudinal aberration in the wide-angle lens assembly 3 of the third embodiment ranges from -0.045 mm to 0.025 mm for the wavelength of 0.436 μm, 0.486 μm, 0.546 μm, 0.588 μm and 0.656 μm. It can be seen from FIG. 6B that the field curvature of tangential direction and sagittal direction in the wide-angle lens assembly 3 of the third embodiment ranges from -0.035 mm to 0.09 mm for the wavelength of 0.436 μm, 0.486 μm, 0.546 μm, 0.588 μm and 0.656 μm. It can be seen from FIG. 6C (in which the five lines in the figure almost coincide to appear as if a signal line) that the distortion in the wide-angle lens assembly 3 of the third embodiment ranges from -66% to 0% for the wavelength of 0.436 μm, 0.486 μm, 0.546 μm, 0.588 μm and 0.656 μm. It is obvious that the longitudinal aberration, the field curvature and the distortion of the wide-angle lens assembly 3 of the third embodiment can be corrected effectively. Therefore, the wide-angle lens assembly 3 of the third embodiment is capable of good optical performance.

What is claimed is:

1. A wide-angle lens assembly, comprising sequentially from an object side to an image side along an optical axis:
   a first lens with negative refractive power and including a concave surface facing the image side;
   a second lens with refractive power and including a concave surface facing the object side;
   a third lens with refractive power and including a convex surface facing the image side;
   a fourth lens with refractive power and including a convex surface facing the object side;
   a fifth lens with refractive power and including a concave surface facing the image side;
   a sixth lens which is a biconvex lens with positive refractive power;
   wherein the second lens and the third lens are cemented together to form a first cemented lens with positive refractive power; and
   the fourth lens and the fifth lens are cemented together to form a second cemented lens with positive refractive power;
   the wide-angle lens assembly satisfies:

$$0.2 \leq TL/\theta_m \leq 0.4,$$

wherein TL is an interval in mm from an object surface of the first lens to an image plane along the optical axis and $\theta_m$ is a half maximum field of view in degree for the wide-angle lens assembly.

2. The wide-angle lens assembly as claimed in claim 1, wherein the second lens is with negative refractive power.

3. The wide-angle lens assembly as claimed in claim 2, wherein the second lens further comprises a convex surface facing the image side.

4. The wide-angle lens assembly as claimed in claim 2, wherein the second lens further comprises a concave surface facing the image side.

5. The wide-angle lens assembly as claimed in claim 1, wherein the third lens is with positive refractive power.

6. The wide-angle lens assembly as claimed in claim 1, wherein the fifth lens is with negative refractive power.

7. The wide-angle lens assembly as claimed in claim 1, wherein the fourth lens is with positive refractive power and further comprises a convex surface facing the image side.

8. The wide-angle lens assembly as claimed in claim 1, wherein the sixth lens is an aspheric lens.

9. The wide-angle lens assembly as claimed in claim 1, further comprising a stop disposed between the third lens and the fourth lens.

10. The wide-angle lens assembly as claimed in claim 1, wherein the first lens satisfies:

$$-3 \leq f_1/R_{12} \leq -1.67,$$

wherein $f_1$ is an effective focal length of the first lens and $R_{12}$ is a radius of curvature of the concave surface of the first lens.

11. The wide-angle lens assembly as claimed in claim 1, wherein the wide-angle lens assembly satisfies:

$$0.7 \leq ER_{11}/f \leq 1.6,$$

wherein $ER_{11}$ is an effective radius of an object side surface of the first lens and f is an effective focal length of the wide-angle lens assembly.

12. The wide-angle lens assembly as claimed in claim 1, wherein the wide-angle lens assembly satisfies:

$$30 \leq Vd_2 - Vd_3 \leq 50,$$

wherein $Vd_2$ is an Abbe number of the second lens and $Vd_3$ is an Abbe number of the third lens.

13. The wide-angle lens assembly as claimed in claim 1, wherein the wide-angle lens assembly satisfies:

$$30 \leq Vd_4 - Vd_5 \leq 50,$$

wherein $Vd_4$ is an Abbe number of the fourth lens and $Vd_5$ is an Abbe number of the fifth lens.

14. A wide-angle lens assembly, comprising sequentially from an object side to an image side along an optical axis:
- a first lens with negative refractive power and including a concave surface facing the image side;
- a second lens with negative refractive power and including a concave surface facing the object side and a convex surface facing the image side;
- a third lens with positive refractive power and including a concave surface facing the object side and a convex surface facing the image side;
- a fourth lens with positive refractive power and including a convex surface facing the object side;
- a fifth lens with refractive power and including a concave surface facing the image side;
- a sixth lens which is a biconvex lens with positive refractive power;
- wherein the second lens and the third lens are cemented together to form a first cemented lens with positive refractive power;
- the fourth lens and the fifth lens are cemented together to form a second cemented lens with positive refractive power; and
- the wide-angle lens assembly satisfies:

$$0.2 \leq TL/\theta_m \leq 0.4,$$

wherein TL is an interval in mm from an object surface of the first lens to an image plane along the optical axis and $\theta_m$ is a half maximum field of view in degree for the wide-angle lens assembly.

15. The wide-angle lens assembly as claimed in claim 14, wherein the first lens further includes a convex surface facing the object side.

16. The wide-angle lens assembly as claimed in claim 14, wherein the first lens further includes another concave surface facing the object side.

* * * * *